US008964292B1

(12) United States Patent
Marason et al.

(10) Patent No.: US 8,964,292 B1
(45) Date of Patent: Feb. 24, 2015

(54) PASSIVE ANISOTROPIC PROJECTION SCREEN

(71) Applicant: Rawles LLC, Wilmington, DE (US)

(72) Inventors: Eric Gifford Marason, San Francisco, CA (US); William Thomas Weatherford, San Mateo, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 14/247,683

(22) Filed: Apr. 8, 2014

Related U.S. Application Data

(63) Continuation of application No. 13/532,693, filed on Jun. 25, 2012, now abandoned.

(51) Int. Cl.
G03B 21/56 (2006.01)
G03B 21/60 (2014.01)

(52) U.S. Cl.
USPC ........................................... 359/449; 359/459

(58) Field of Classification Search
USPC .................................. 359/449, 459, 461, 597
See application file for complete search history.

(56) References Cited

U.S. PATENT DOCUMENTS

| 2,022,144 | A | 11/1935 | Nicolson |
|---|---|---|---|
| 2,132,904 | A | 10/1938 | Martinez |
| 6,424,463 | B1 | 7/2002 | Nishitani |
| 7,453,637 | B2 | 11/2008 | Taira et al. |
| 7,495,828 | B2 | 2/2009 | Ishii |
| 7,667,893 | B2 | 2/2010 | Peterson et al. |
| 7,768,704 | B2 | 8/2010 | Burkum |
| 2004/0080822 | A1 | 4/2004 | Shafer |
| 2010/0195201 | A1 | 8/2010 | Minoura et al. |
| 2011/0069385 | A1 | 3/2011 | Katsuma et al. |

FOREIGN PATENT DOCUMENTS

WO WO2011088053 7/2011

OTHER PUBLICATIONS

Office action for U.S. Appl. No. 13/532,693, mailed on Mar. 29, 2013, Marason et al, "Passive Anisotropic Projection Screen", 13 pages.
Office action for U.S. Appl. No. 13/532,693, mailed on Aug. 30, 2013, Marason et al., "Passive Anisotropic Projection Screen", 5 pages.
Pinhanez, "The Everywhere Display Projector: A Device to Create Ubiquitous Graphical Interfaces", IBM Thomas Watson Research Center, Ubicomp 2001, 18 pages.

*Primary Examiner* — Christopher Mahoney
(74) *Attorney, Agent, or Firm* — Lee & Hayes, PLLC

(57) ABSTRACT

An anisotropic projection screen accepts light projected at non-normal angles and redirects the light as high quality images along a viewing path that is near normal to the screen. This allows side projection of images in a manner that avoids the potential viewer obstruction of the projection path. The images may be projected onto the screen from any angle (e.g., sides, top, bottom, etc.) relative to the screen surface, and then redirected to the viewer who is viewing the screen essentially normal to the screen surface. The screen has arrays of passive elements that are oriented to collect and redirect light from one direction, while rejecting or absorbing light received from another direction.

22 Claims, 8 Drawing Sheets

PASSIVE ANISOTROPIC PROJECTION SCREEN

RELATED APPLICATIONS

The present application is a continuation of and claims priority to U.S. patent application Ser. No. 13/532,693 filed on Jun. 25, 2012, entitled "Passive Anisotropic Projection Screen", which is incorporated by reference herein in its entirety.

BACKGROUND

Passive display screens are used to present images that are projected by a projector. Home entertainment systems often use projection systems to project images onto a passive screen to provide a big screen, high quality viewing experience. Unfortunately, passive display screens can suffer significant loss of image contrast due to light from non-projector sources, such as room lights, daylight from windows, and so forth. As a result, quality of the image presented on existing passive display screens can be poor.

Another challenge that may impact viewing quality in projection systems is the physical arrangement of the screen within an environment, relative to the projector, and relative to the viewer(s). Ideally, for a conventional screen, the projector should project the image from a location that is normal to a planar surface of the screen. The viewer should also have a point of view that is normal to the planar surface. But, in this arrangement, the viewer's body (e.g., head, shoulders) may intercept at least a portion of the projected image, blocking that image from reaching the screen. To avoid this unintended obstruction, projectors may be placed in front of the viewers, or from an overhead position. However, these placements may not help. For instance, placing the projector in front of the viewers may obstruct the view of the viewer, and moving the projector relative to a conventional screen may cause degradation in the quality of the image presented on the screen.

Accordingly, there is a need for improved screen technologies that better accommodate off angle projection of images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Projection systems are used in a variety of environments including movie theaters, conference rooms, classrooms, homes, and so forth. These projection systems include a projector configured to emit light towards a projection surface or screen. The projection surface in turn is configured to accept and scatter the light such that an image is presented to viewers. The projection surface may be fixed, such as one that mounts to a wall or a stand, or portable, such as a handheld projection screen.

Projecting onto portable handheld projection screens pose unique challenges. For instance, when projecting onto a portable screen at near normal angles, the viewer's head or shoulders may at times obscure the image. Projecting at an angle to the screen can avoid obstruction of the projection path, but often at the expense of image brightness. Furthermore, when using conventional flat reflective (e.g., white) surfaces, most of the light flux projected onto the surface misses the viewer's viewing cone via Lambertian scattering.

Disclosed herein are anisotropic projection screens that accept images projected at non-normal angles and reflect high quality images at near normal angles back to the viewer. These anisotropic projection screens are configured to accept projected light from the projector at non-normal or incidence angles from one side of the screen and redirect the light, within a viewing cone having a center axis near normal to the screen, back toward the viewer for presentation. Additionally, the screen quenches or redirects ambient light received at large incidence angles from the opposite side of the screen by absorption. As a result, image contrast and brightness are increased, and obscuration of the projection path by the viewer's body is decreased or entirely avoided.

The projection system with a passive directive screen may be implemented in many ways. One illustrative implementation is described below in which the projection system is implemented as part of an augmented reality environment within a room. However, the system may be implemented in many other contexts and situations in which images are projected onto screens for viewing consumption.

Illustrative Environment

Figure 1:
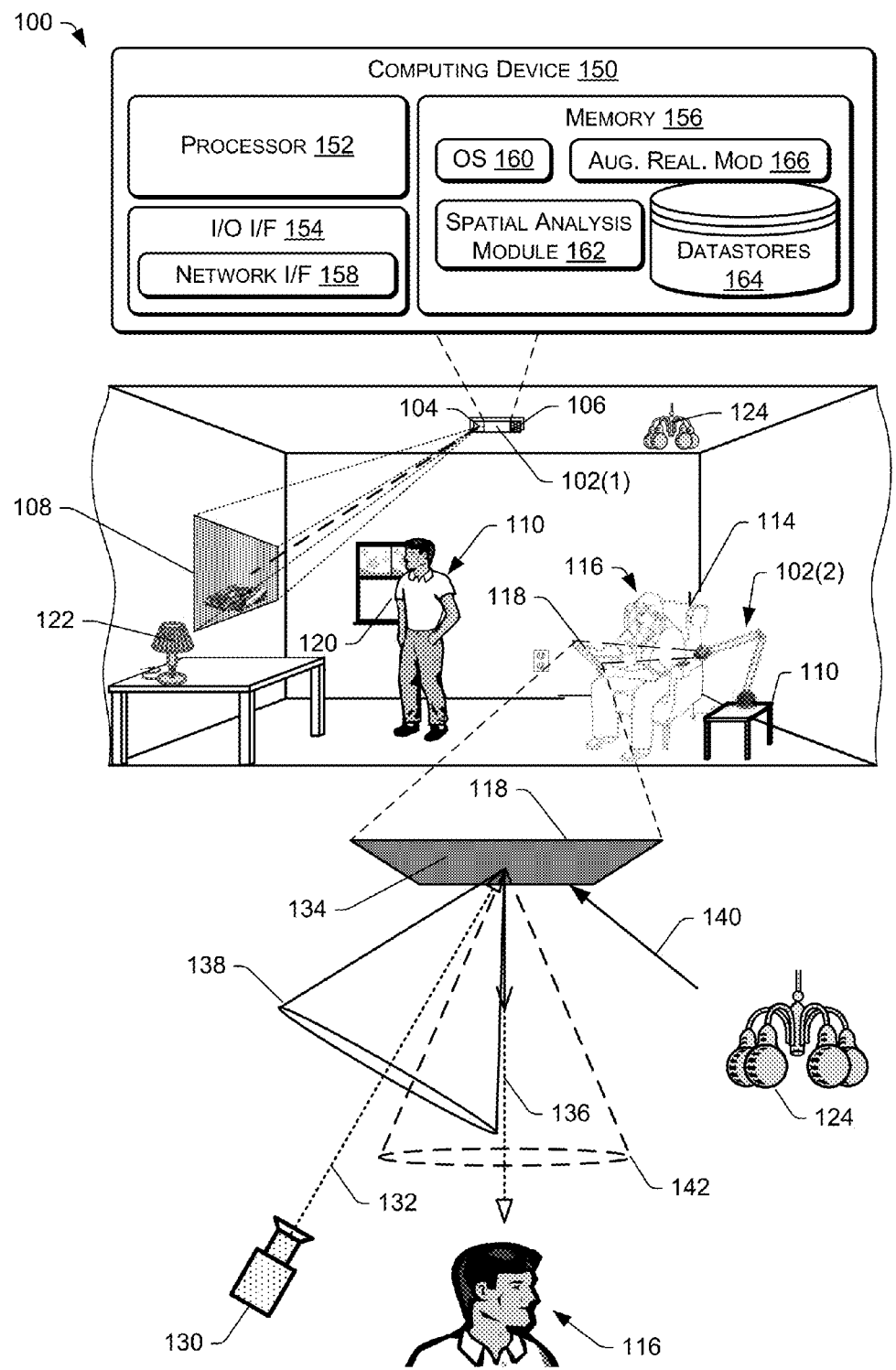
FIG. 1 shows an illustrative scene containing projectors the project images onto passive anisotropic screens. Each anisotropic screen has passive elements that create an acceptance cone for handling off-angle projection of images and a viewing cone for viewing of those images by a viewer.

FIG. 1 shows an illustrative environment 100 in which a projection system with a passive anisotropic projection screen may be used. In this illustration, the environment 100 may be an augmented reality environment created within a scene, and hosted within an environmental area, such as a room (e.g., room in a home, conference room, etc.). Two augmented reality functional nodes (ARFN) 102(1)-(2) are shown within the room. Each ARFN contains projector(s), camera(s), and computing resources that are used to generate the augmented reality environment 100. In this illustration, the first ARFN 102(1) is a fixed mount system that may be mounted within the room, such as to the ceiling, although other placements are possible. The ARFN 102(1) includes a projector 104 and an associated camera 106 mounted on a common chassis. The projector 104 projects images onto a passive anisotropic screen 108 mounted or otherwise formed on a wall of the room. The images are projected at an off angle direction, such as downward elevationally from above the screen 108 at a non-normal incidence angle to the screen 108. The images are then directed from the anisotropic screen 108 back toward a first user 110 along a path that is substantially normal with the screen 108. The first user 110 may watch and interact with the images being projected onto the screen 108, and the camera 106 of the ceiling-mounted ARFN 102(1) may capture that interaction.

A second ARFN 102(2) is embodied as a table lamp, shown sitting on a small table 112 next to a chair 114. A second user 116 is seated in the chair 114 and is holding a portable anisotropic projection screen 118. The second ARFN 102(2) is equipped with a projector and a camera within the head of the lamp structure. The projector projects images from a side angle (i.e., non-normal to the surface of the screen 118) onto the surface of the portable screen 118 and the screen redirects the images toward the user 116 for the user to view and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. In the implementations described herein, the screen 118 is an entirely passive, non-electronic, device with individual features that redirect off angle projected images back along a path that is near normal to the surface of the screen.

Since the portable screen 118 may be moved by the user 116, the projector in the lamp-based ARFN 102(2) may be configured to track the portable screen 118 during movement within the room and project an image onto it for presentation. Tracking may be accomplished by recognizing the shape of the screen 118, following optical targets disposed on the screen, and so forth.

In addition to projecting visible images for the viewers 110 and 116, each ARFN 102 may also be used to create an augmented reality environment. In this situation, the projectors may further be used to project structured light patterns onto the surroundings of the room and the associated camera captures the images. The structured light patterns may use invisible light so that the human viewers do not detect the patterns. In still other implementations, each ARFN 102 may employ IR-based illumination systems to illuminate a scene and time-of-flight sensors are used to help image the surrounding environment for creation of the augmented reality environment.

The projectors associated with ARFNs 102(1) and 102(2) may be implemented with any number of technologies capable of generating an image and projecting that image onto a surface. Suitable technologies include a digital micromirror device (DMD), liquid crystal on silicon display (LCOS), liquid crystal display, 3LCD, laser projector, and so forth. In some implementations, each ARFN may include a plurality of projectors to project images.

The room may include several non-projector light sources, such as a window 120, an overhead light fixture 122, a table lamp light fixture 124, and so forth. These non-projector light sources may produce interfering light that impinges upon at least a portion of the projection screens 108 and 118. This interfering light may degrade the image to the point that the presentations to the viewers 110 and 114 are unacceptable. The various projection screens 108 and 118 are further designed to reflect incoming light in a directed manner. The screens 108 and 118 include features that can be oriented and arranged to accept and redirect a projected image in one direction, while concurrently absorbing interfering light or reflecting it in another direction.

In one implementation, the anisotropic projection screens may comprise a structural substrate such as a foam core, plastic sheet, and so forth. The longest linear dimension of the substrate, when in use, is approximately 60 centimeters or less. The weight of the portable projection screen 118 may be less than three kilograms in some implementations. The structural substrate may be configured to be rigid, foldable, rollable, and so forth. Atop the structure substrate is a sheet of material that is embossed with features that directionally reflect the projected images. In one implementation, the screen comprises a stiff sheet of plastic, embossed on one side with tiny off-axis paraboloidal mirrors closely packed in an array. This implementation is described in more detail with respect to FIG. 2.

With reference to the fixed screen 108, a line of viewing extends from the image to the viewer 110. The line of viewing may be substantially horizontal as the viewer is standing up. In other arrangements, the line of viewing may be angled relative to the floor as the viewer may be sitting in a recliner, or the screen may be positioned lower on the wall below the viewer's eye level. The projected image comes from overhead and approaches the screen 108 at an angle non-normal to the screen surface. The screen redirects the image to the viewer 110 along the line of viewing that is substantially normal to the screen surface.

The anisotropic aspect of screens 108 and 118 are further illustrated with respect to the enlarged view of the portable screen 118 beneath the picture of the room. A projector 130 represents the projector in the lamp head of ARFN 102(2). The projector 130 is shown projecting an image along a projection axis 132 that is angled, or non-normal, relative to a surface plane 134 of the screen 118. A normal 136 is shown perpendicular or orthogonal to the surface plane 134 of the projection screen 118.

An acceptance cone 138 describes an angular range relative to the projection axis 132 within which incident light will be accepted and reflected generally back towards the viewer 116 along the normal 136. For example, as shown here, the light from the projector 130 is within the acceptance cone 138 from a side angle and is reflected back to the viewer 116. In some implementations, the acceptance cone 138 may extend 30 degrees from the projection axis 132. Incident light which is outside the acceptance cone 138 is rejected. For example, interfering light 140 from the light fixture 124 impacts the screen 118 outside of the acceptance cone 138 (i.e., greater than 30 degrees from the axis 132). The screen 118 is configured to reject this interfering light by various techniques, such as redirecting the light away from the viewer 116, absorbing the light, and so forth.

A viewing cone 142 may describe an angular range in which the viewer 116 is able to view the image being redirected by the screen 118. The viewing cone 142 is the angular range about the normal 136 along which reflected light 144 is returned for viewing by the viewer 116. One example angle for the viewing cone 142 is approximately 30 degrees.

As further shown in FIG. 1, the acceptance cone 138 has a center axis (which, as illustrated, coincides with the projection path 132) and the viewing cone 142 has a center axis (which, as illustrated, coincides with the normal 136). The two center axes of the cones 138 and 142 may form any angle, with representative angles being within a range of approximately 30 to 60 degrees.

Accordingly, the projection screen 118 accepts projected light within an acceptance cone 138 at incidence angles from one side of the screen 118 (e.g., left side as shown) and redirects it in a viewing cone 142 normal to the screen surface 134 and toward the viewer 116. Further, the projection screen 118 quenches or redirects ambient light at incidence angles from the opposite side (e.g., the right side as shown) of the screen 118 by absorption. As a result, image contrast and brightness are increased and the viewer's body does not obstruct the off angle projection path from the projector 130.

Associated with each ARFN 102(1)-(2), or with a collection of ARFNs, is a computing device 150, which may be located within the augmented reality environment 100 or disposed at another location external to it. Each ARFN 102 may be connected to the computing device 150 via a wired network, a wireless network, or a combination of the two. The computing device 150 has a processor 152, an input/output interface 154, and a memory 156. The processor 152 may include one or more processors configured to execute instructions. The instructions may be stored in memory 156, or in other memory accessible to the processor 152, such as storage in cloud-based resources.

The input/output interface 154 may be configured to couple the computing device 150 to other components, such as projectors, cameras, microphones, other ARFNs, other computing devices, and so forth. The input/output interface 154 may further include a network interface 158 that facilitates connection to a remote computing system, such as cloud computing resources. The network interface 158 enables access to one or more network types, including wired and wireless networks. More generally, the coupling between the computing device 150 and any components may be via wired technologies (e.g., wires, fiber optic cable, etc.), wireless technologies (e.g., RF, cellular, satellite, Bluetooth, etc.), or other connection technologies.

The memory 156 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 156 and configured to execute on a processor, such as the processor 152. An operating system module 160 is configured to manage hardware and services within and coupled to the computing device 150 for the benefit of other modules.

A spatial analysis module 162 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 162 provides the information used within the augmented reality environment to provide an interface between the physicality of the scene and virtual objects and information.

One or more datastores 164 may be provided within the memory 156 or separate therefrom. Examples datastores include a system parameters datastore configured to maintain information about the state of the computing device 150, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

Another example datastore 164 is an object parameters datastore configured to maintain information about the state of objects within the scene. The object parameters may include the surface contour of the object, overall reflectivity, color, and so forth. This information may be acquired from the ARFN, other input devices, or via manual input and stored within the object parameters datastore.

Still another example datastore 164 is an object datastore 168 configured to maintain a library of pre-loaded reference objects. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module 162 may use this data maintained in the datastore to test dimensional assumptions when determining the dimensions of objects within the scene. In some implementations, the object parameters in the object parameters datastore may be incorporated into the object datastore. For example, objects in the scene which are temporally persistent, such as walls, a particular table, particular users, and so forth may be stored within the object datastore. The object datastore may be stored on one or more of the memory of the ARFN, storage devices accessible on the local network, or cloud storage accessible via a wide area network.

An augmented reality module 166 is configured to generate augmented reality output in concert with the physical environment. The augmented reality module 166 may employ essentially any surface, object, or device within the environment 100 to interact with the users. The augmented reality module 166 may be used to track items within the environment that were previously identified by the spatial analysis module 162. The augmented reality module 166 includes a tracking and control module configured to track one or more items within the scene and accept inputs from or relating to the items.

The ARFNs 102 and computing components of device 150 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Example Implementations of Anisotropic Projection Screen

FIGS. 2-6 show examples of passive anisotropic projection screens, such as stationary screen 108 and portable screen 118 of FIG. 1.

Figure 2:
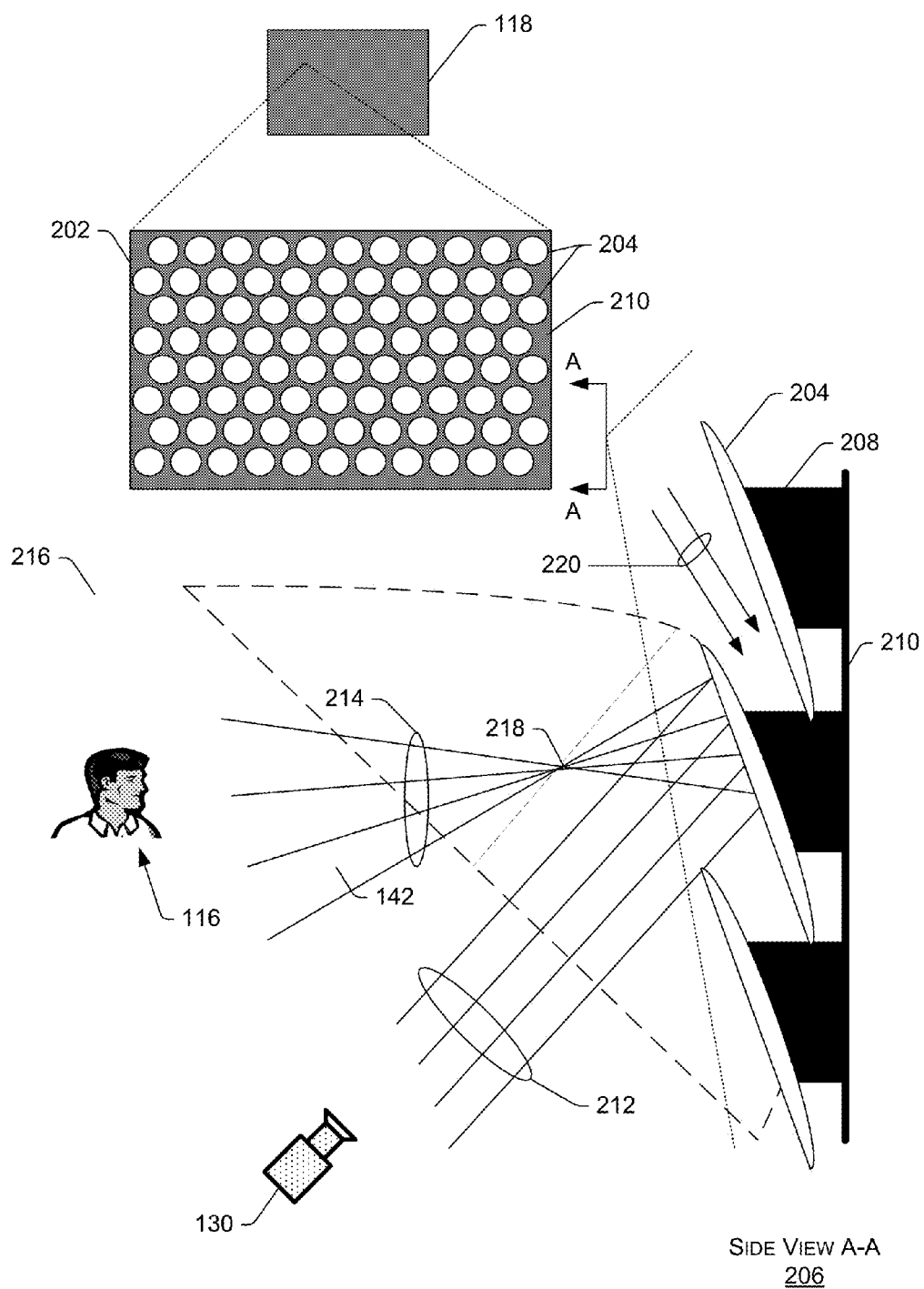
FIG. 2 illustrates one example implementation of an anisotropic projection screen having an array of off-axis paraboloidal mirrors.

FIG. 2 illustrates a first example implementation of an anisotropic projection screen, such as portable projection screen 118. The screen 118 is formed of a sheet of stiff material, such as plastic, embossed with features on one side that facilitates an off-axis acceptance cone while redirecting light along a near normal axis viewing cone. In one implementation, the features may be embossed in a material of acrylic, polycarbonate, or cyclic olefin copolymer (COC).

An enlarged portion of the screen 118 is shown as screen portion 202. This screen portion 202 has an array of tiny off-axis paraboloidal mirrors 204 closely packed in linear arrays that are slightly offset in every other row. One representative pattern is shown in FIG. 2. Other patterns may be used, as long as the paraboloidal mirrors are densely arranged on the substrate. Each mirror is shown as having a circular perimeter, although other forms and shapes are possible, such as mirrors with a hexagonal perimeter.

An even more enlarged, side view 206 is shown taken along line A-A. Each mirror 204 sits atop a pedestal 208, which in turn are mounted or integrally formed with a backplane or substrate 210. The pedestal 208 holds or extends the mirror 204 away from the substrate 210, and orients the mirror at an angle relative to the substrate. As one example, the mirrors may be oriented in a range of 5 to 40 degrees relative to the substrate 210. The pedestals 208 may comprise a width or diameter sufficient to fully encompass the mirrors 204 such that the outer perimeters of the mirrors are formed into the pedestals, or the pedestals 208 may have a width or diameter less than that of the mirrors (as shown for discussion purposes to demonstrate the extended and angular mount of the mirrors 204).

The bulk or sides of the pedestals 208 may be black or clear plastic, and the backplane 210 is black. If the pedestals are black, the pedestals may be used to absorb ambient or scattered light. If clear plastic is used, the pedestals 208 pass the light to the black light-absorbing backplane 210, which aids in the quenching of rejected/scattered light. A transparent, protective layer (not shown) may be overlaid on the mirrors in some implementations.

Each mirror 204 has a diameter and spacing that may be configured, at least initially, dependent upon an assumed distance of the anticipated viewer location. As one example, an individual mirror 204 is sized on the order of a pixel or smaller. For the hand held screen 118, each mirror may be on order of 5 to 200 microns, with about 60 microns being one suitable size. The center-to-center spacing might range from 40 to 100 microns. Assuming a 60 micron diameter of the mirrors, the spacing may be approximately 60-70 microns for a quality on par with 220 dpi print quality. The mirror apertures are illustrated as oval shaped (circular, elliptical, etc.), although other geometries may be used, such as hexagonal, for higher efficiency.

The pedestals 208 hold the mirrors at angles relative to a back plane. Due to this angled orientation, the mirrors 204 accept light from one side or direction and reflect it back toward the viewer within the viewing cone. In FIG. 2, light rays 212 are projected from the projector 130 at an incidence angle of 45 degrees from the "seeing" or non-quenching side of the screen. The light rays 212 impact the curved paraboloidal mirrors 204 and are reflected back as reflected rays 214 toward the viewer 116 in a direction that is near normal with the screen 118. The reflection characteristics of the paraboloidal mirrors are represented by the dashed semispherical line 216. The reflected rays 214 are focused through a point 218. The viewing cone angle 142 for the reflected rays 214 is determined by the f-number of the small mirrors, where the f-number is focal length divided by diameter (e.g., f-number=focal length/diameter). The f-number of the projected image is large enough that it can be considered collimated in approximation. One example f-number for nearly collimated light reaching the screen is approximately F/75, which may also be referred to as the "image plane effective f-number".

Incident light received from the other sides, represented by light rays 220, essentially misses the reflective surface of the mirrors and is absorbed into the black pedestals 208 and/or backplane 210. These other incident rays may also impact the mirrors but be reflected outside of the viewing cone 142. In this manner, light from this "blind side" of the screen is quenched or redirected away from the viewing cone 142.

One advantage of this anisotropic projection screen, as well as those described below with respect to FIGS. 3-6, over traditional flat white screens is that the image appears brighter. By collecting the light and refocusing it back to the user, a gain is achieved to render a brighter image. Generally, the gain can be quantified as the ratio of the 2*pi solid angle of Lambertian scattering to the smaller solid angle into which the light is directed.

Figure 3:
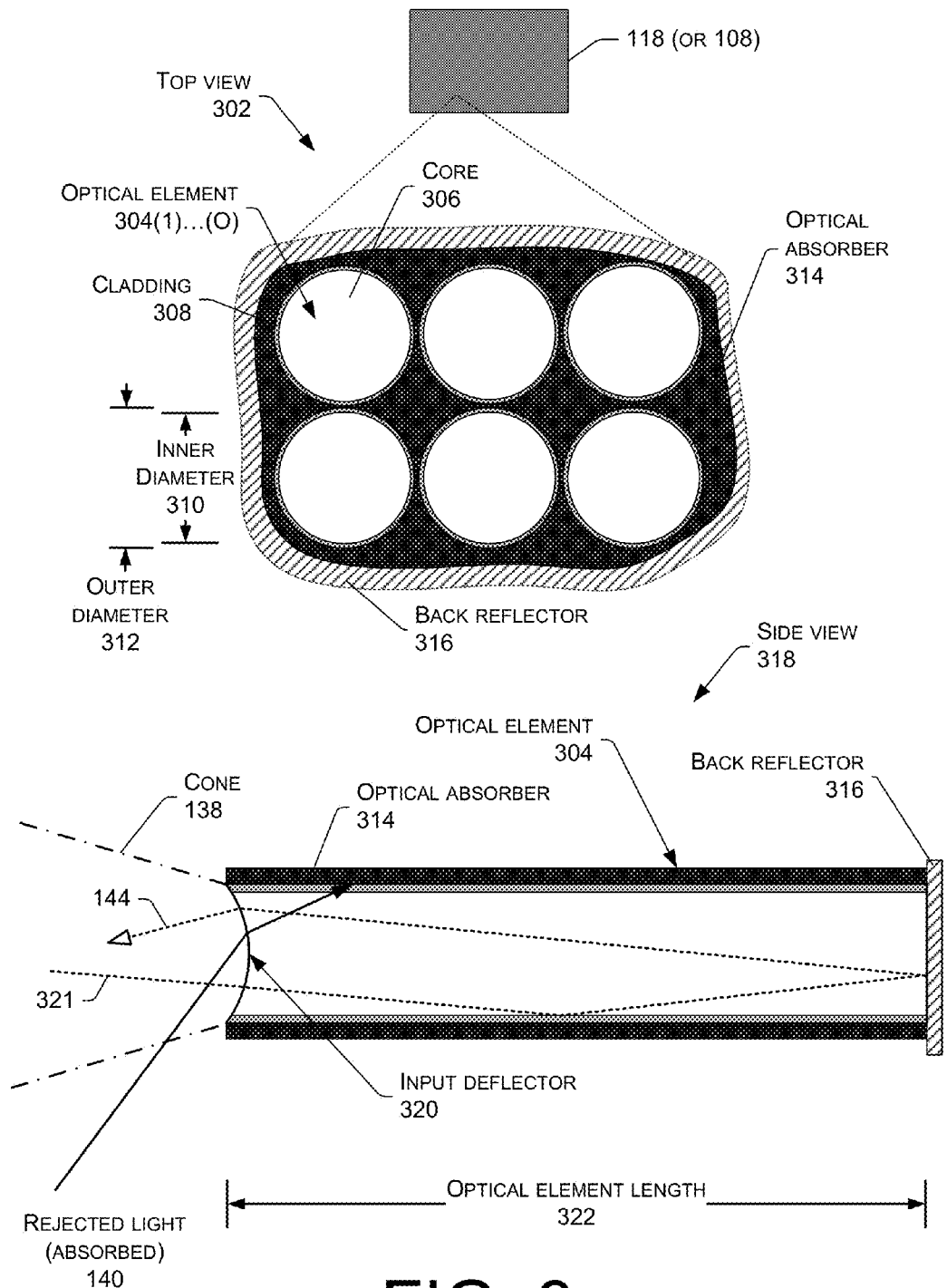
FIG. 3 illustrates another example implementation of a passive projection screen, and shows an enlarged portion of a projection screen as having optical waveguides.

FIG. 3 illustrates an enlarged portion 300 of a projection screen 118 (or 108). A top view 302 is taken looking down on the screen 118, and magnified to show a plurality of optical elements 304(1), 304(2), . . . , 304(O). The optical elements 304(1)-(O) may be arranged in a number of ways. In this illustration, the elements are arranged in a matrix of linear rows and columns. The optical elements 304 comprise optical waveguides that conduct light. The optical elements 304 may include, but are not limited to, optical fibers as shown here.

Each optical fiber of an element 304 comprises a core 306 surrounded by a thin cladding 308. The core 306 may be formed of a light conducting material, such as glass, plastic, crystalline material, and so forth. When the optical elements 304 comprise optical fibers, the refractive index of the core 306 may be about 1.589 while the refractive index of the cladding 308 is about 1.517.

The optical elements 304(1)-(O) may be sized such that their width or diameter is equal to or less than a minimum width of a projected pixel. In the example shown here, an inner diameter 310 of the core 306 may be about 94 microns, while an outer diameter 312 of the surrounding cladding 308 may be about 100 microns. Accordingly, individual optical elements 304(1)-(O) are about 100 microns, although they may be smaller.

The optical elements 304 may be held in place or distributed within a matrix configured as an optical absorber 314. The optical absorber 314 is configured to be highly absorptive of visible light frequencies. For example, the optical absorber 314 may comprise black glass, carbon black, or a dark pigment. The matrix may aid in maintaining the optical elements in a generally parallel arrangement with one another.

Behind the optical elements 304 is a back reflector 316. This back reflector 316 is optically coupled to the optical elements 304, and is configured to be highly reflective to visible light frequencies. For example, in some implementations the back reflector 316 may comprise a sputtered aluminum mirror. The reflector may be configured to act as a notch filter, reflecting light of particular frequencies. In some implementations, different back reflectors 316 may be configured to act as different optical notch filters for different optical elements 304.

Each optical element 304 is elongated, projecting outward from the back reflector 316. FIG. 3 illustrates a side view 318 of one optical element 304. Light enters the optical element 304 via an input deflector 320 disposed at the entrance or front of the optical element 304. The input deflector 320 is configured to alter a direction of incident light, and prevents an input angle from matching an exit angle. Such alteration expands the viewing cone and improves the angular range relative to the normal within which the viewer 116 may see the image. As shown here, the input deflector 320 may comprise a concave feature present in the optical element 304. For example, an optical fiber may be ground or etched to produce the described concavity. The radius of curvature of the concavity of the input deflector 320 may vary. In the implementation shown, the radius of curvature is about 167 microns. In some implementations, the input deflector 320 may comprise a plano-concave lens optically coupled to the front of the optical element 304. In another implementation, a plurality of optically refractive elements may be used, such as glass or plastic beads.

As shown here, incoming light 321 received by the optical element 304 within the acceptance cone 138 enters the input deflector 320 and undergoes a change in direction. The light continues down the optical element 304 by internal reflection, reaches the back reflector 316, and is reflected the back down the optical element 304 for eventual exit as reflected light 144. In contrast, incoming light 140 incident on the optical element 304 at an angle outside of the acceptance cone 138 enters the input deflector 320, but fails to transfer down the optical element 304 via internal reflection. Instead, the light is readily absorbed by the optical absorber 314 and hence rejected in that it is not reflected out from the optical element 304.

The optical element 304 has a length 322 from front to the back reflector 316. In one implementation, the length 322 may be a multiple of about five to ten times the outer diameter 312. In another implementation, the length 322 may be at least ten times the outer diameter 312. The optical element length 322 may vary between optical elements 304 within the screen.

Figure 4:
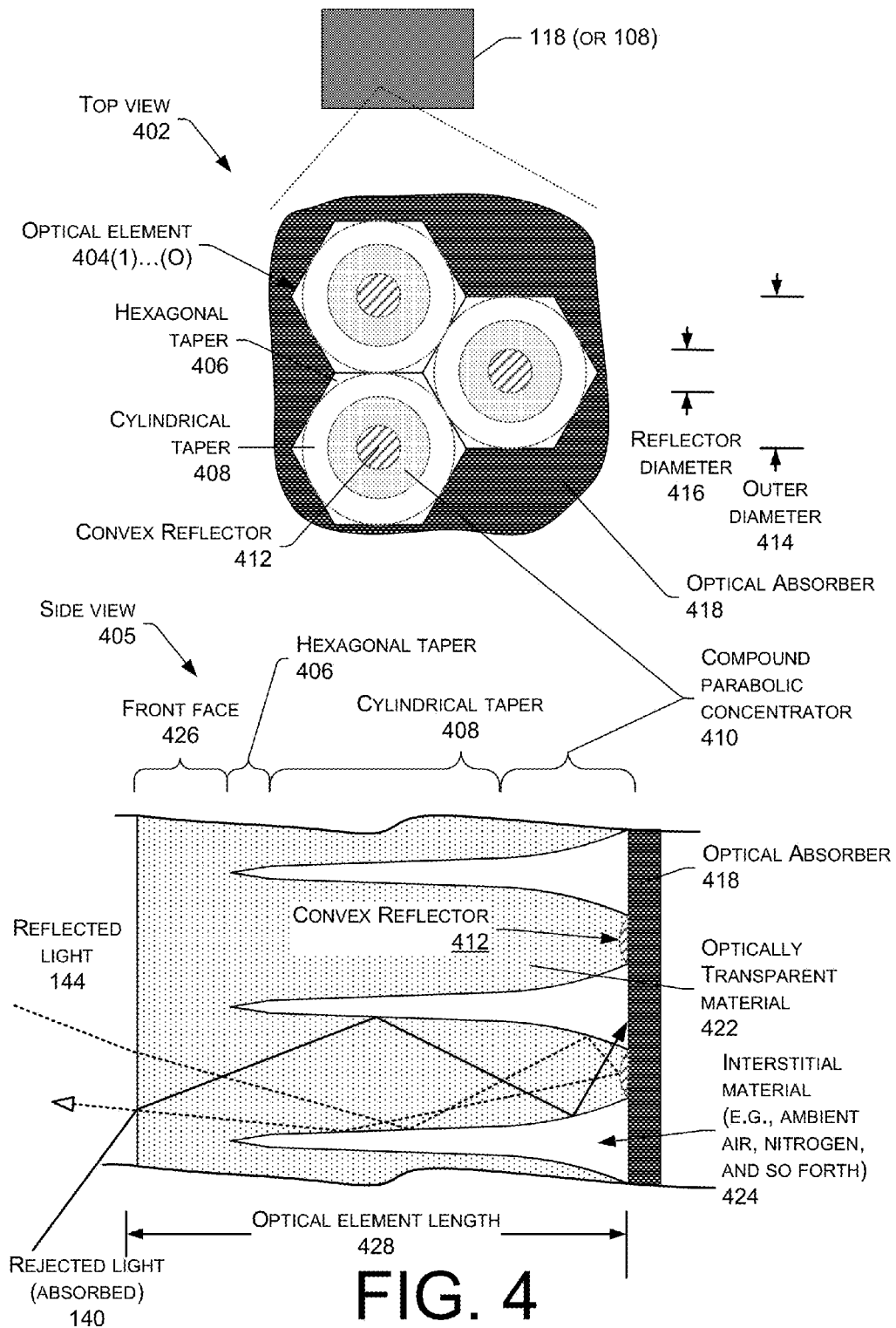
FIG. 4 illustrates an enlarged portion of a projection screen comprising an array of tapered optical guides, according to yet another implementation.

FIG. 4 illustrates an enlarged portion 400 of the directive projection screen 118 (or 108), which comprises an array of tapered optical guides. A top view 402 taken from the screen 118 and magnified shows a plurality of optical elements 404(1), 404(2), ..., 404(O). The optical elements 404(1)-(O) are arranged linearly in columns, with a half width offset so that the hexagonal perimeters nest with one another as shown. In addition to the top view 402 of the optical elements, a side view 405 is also illustrated.

Each of the optical elements 404(1)-(O) have a varying contour that includes an upper hexagonal taper 406, a middle cylindrical taper 408, and lower a compound parabolic concentrator 410. At the base of each optical element is a convex reflector 412. While an initial taper of a hexagon is shown, in other implementations one or more other shapes may be used. An outer diameter 414 of the optical element is tailored to an expected size of the projected pixels comprising the image. For example, the width or outer diameter 414 may be about 100 microns. A reflector diameter 416 may vary according to the arrangement of the compound parabolic concentrator 410. In one implementation, the reflector diameter 416 may be about 36 microns in diameter and have a radius of curvature of about 170 microns. As above, the convex reflector 412 may comprise sputtered aluminum. The reflector may be configured to act as a notch filter which reflects light of particular frequencies. In some implementations, the different reflectors may be configured with different optical notch filters.

Disposed behind the optical elements 404 is an optical absorber 418. The optical absorber 418 is configured to be highly absorptive of visible light frequencies. For example, the optical absorber 418 may comprise carbon black, or a dark pigment.

As shown in the side view 405, the optical elements 404 are disposed generally in parallel with one another, and perpendicular to a plane of the screen 118 in which they reside. The optical elements 404 comprise an optically transparent material 422. For example, in some implementations, a clear flexible silicone elastomer may be used. In other implementations acrylic, other polymers or glass may be used. Between portions of the optical elements 404 is an interstitial space, which may be filled with an interstitial material 424 such as an aerogel, gas, and so forth. A substantially planar front face 426 is shown at the front of the optical elements 404. The optical elements 404 may be individual elements and discrete from one another, or form sections or groups, such as shown here where the same optically transparent material 422 forms at least four of the optical elements 404 and the front face 426.

The side view 405 shows the transition from the front face 426 having the hexagonal taper 406 with a hexagonal cross section, then to the cylindrical taper 408 having a cylindrical cross section and finally to the compound parabolic concentrator 410 having a cylindrical cross section. Stated another way, from the front face 426, the optical element 404 transitions from a hexagonal prism in the hexagonal taper 406 to a cylinder in the cylindrical taper 408 to the compound parabolic concentrator 410. Within a focal point at a base of the compound parabolic concentrator 410 is the convex reflector 412. The convex reflector 412 is disposed such that the convexity extends towards the front face 426.

As shown here, reflected light 144 is light which is incident within the acceptance cone, enters the front face 426 and proceeds through the optically transparent material 422 via internal reflection. The light is concentrated via the compound parabolic concentrator 410 onto the convex reflector 412, where the light is reflected back out through the optical element 404. The reflected light 144 leaves the optical element 404 at a different angle compared to an entry angle. As mentioned above, this improves viewability by expanding the viewing cone within which the viewer 116 is able to see the image.

In contrast, rejected light 140 enters at an incident angle outside the acceptance cone and eventually exits the optically transparent material 422 through the interstitial material 424, where it is absorbed by the optical absorber 418. As a result, light outside of the acceptance cone is effectively rejected, improving the presentation of light from the projector which is within the acceptance cone.

In another implementation, the front face 426 may comprise a separate sheet coupled to the optical elements 404 at or near the front edge of the hexagonal taper 406. Each optical element 404 has an optical element length 428 that extends from an outermost edge of the front face 426 to the optical absorber 418 may be between 200 and 500 microns. Omitting the front face 426, a linear distance from the front of the hexagonal taper 406 to the optical absorber 418 may be about 300 microns.

In some implementations, when the optically transparent material 422 is deformable, the convex reflector 412 may be a surface feature of the optical absorber 418. Upon assembly, the convex reflector 412 may compress at least a portion of a tip of the optically transparent material 422. For example, in one implementation the optical absorber 418 may comprise black acrylic having convex reflector surface features. When assembled with the optical elements 404 comprising flexible silicone, the convex reflector surface features compress the flexible silicone of the optical elements 404. This results in the placement of the convex reflector 412 within the compound parabolic concentrator 410 of the optically transparent material 422.

Figure 5:
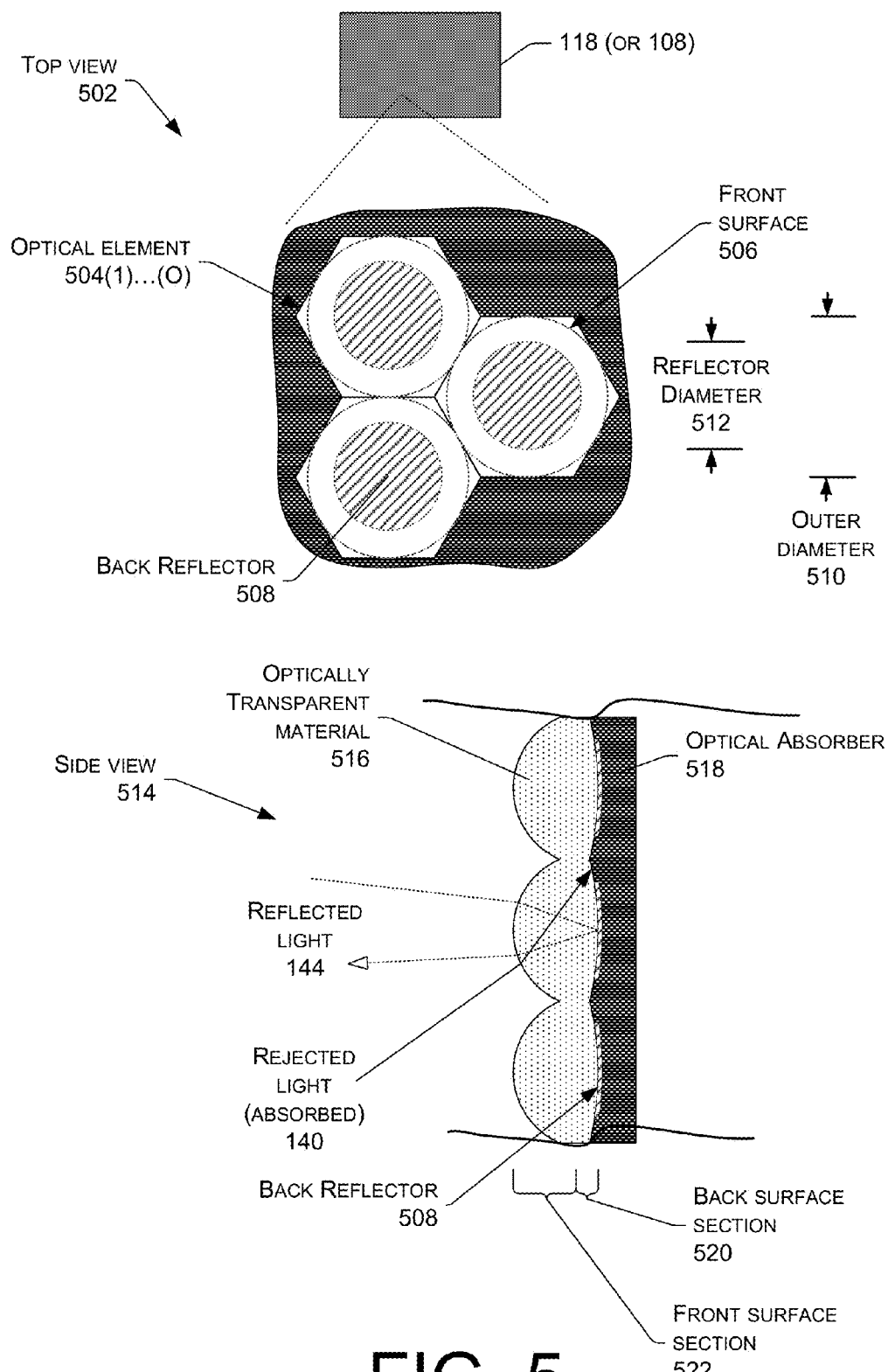
FIG. 5 illustrates an enlarged portion of a projection screen comprising an array of convex lenses having front surfaces and back surfaces with back reflectors.

FIG. 5 illustrates an enlarged portion 500 of a directive projection screen 118 (or 108), which includes an array of convex lenses having front surfaces and back surfaces with back mirrors. A top view 502 taken from the screen 118 and magnified shows a plurality of optical elements 504(1), 504(2), ..., 504(O) forming part of the projection screen. Each optical element 504 has a front surface or lens 506, a back surface or lens having about the same diameter, and a back reflector 508 disposed on or proximate to the back lens. These lenses may be spherical, aspherical, or a combination thereof. As described above, the optical element 504 may be sized such that its width or diameter is equal to or less than a minimum width of an estimated size of pixels from the projector 102. In one implementation, the optical element 504 has an outer diameter 510 of the front and back surfaces that is about 100 microns. A reflector diameter 512 is also shown, which is less than the outer diameter 510 of the lenses.

A side view 514 depicts the composition of the optical elements 504. The optical element 504 is formed of an optically transparent material 516, such as a clear silicone material. This may be a single piece of material, or a plurality of pieces bonded together. An optical absorber 518 is positioned behind the optical elements 504, and is configured to substantially absorb incident visible light.

The optical element 504 may be visualized as a convex back lens section 520 and a convex front lens section 522. The back lens section 522 comprises back surfaces which have a radius of curvature which is greater than a radius of curvature of the front surfaces. For example, the radius of curvature of the front lens may be about 55 microns while a radius of curvature of the back lens may be about 222 microns. These lenses may be spherical or aspherical.

At least a portion of each of the back surfaces is configured with the back reflector 508. For example, as shown here, the back reflector 508 is radially symmetrical about an optical axis and is configured with a diameter of about two-thirds the diameter of the back lens. In other implementations, the back reflector 508 may be displaced along the back of the back lens, asymmetrical, or both. Continuing the example above where the outer diameter 510 is about 100 microns, the back reflector 508 may be about 70 microns in diameter.

The optical absorber 518 is positioned behind the back lens section 520. As above, the optical absorber 518 is configured to be highly absorptive of visible light frequencies. For example, the optical absorber 518 may comprise carbon black or a dark pigment. In some implementations, the optical absorber 518 and the back reflectors 508 may be incorporated into a single structure. For example, a black plastic sheet acting as the optical absorber 518 may be coated with sputtered aluminum in particular spots to form the back reflectors 508.

As shown here, reflected light 144 is initially directed incident within the acceptance cone, entering the optically transparent material 516, and then reflected back from the back reflector 508. In contrast, the rejected light 140, which is received at an angle outside the acceptance cone enters the optically transparent material 516 and is directed into the optical absorber 518.

Figure 6:
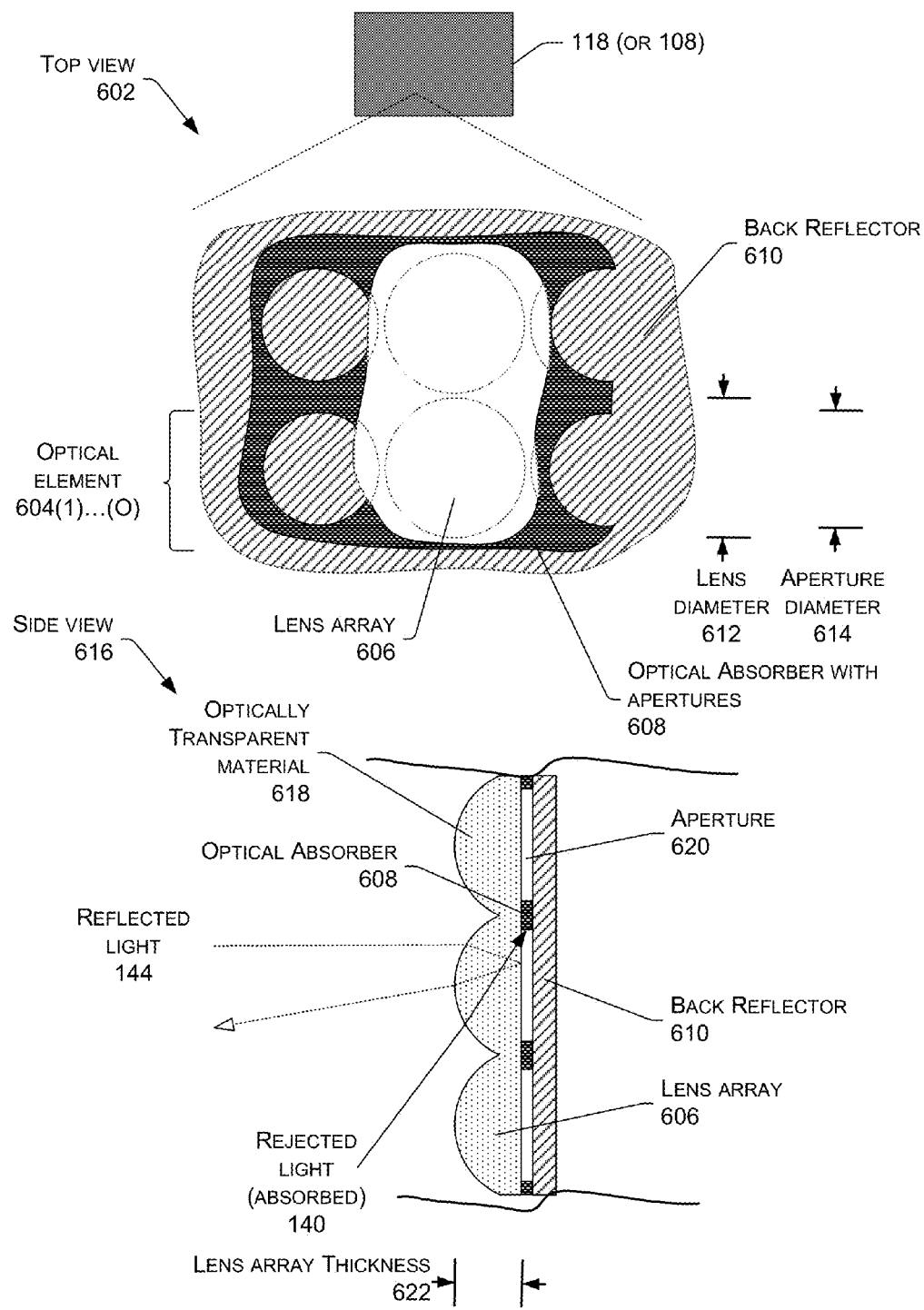
FIG. 6 illustrates an enlarged portion of a projection screen comprising a convex lens array with an optical absorber having apertures and back reflectors.

FIG. 6 illustrates an enlarged portion 600 of a directive projection screen 118 (or 108), which includes a plano-convex lens array with an optical absorber having apertures and a back mirror. As shown here in a top view 602, the screen 118 has a plurality of optical elements 604(1), 604(2), . . . , 604(O). These optical elements 604(1)-(O) comprise a lens array 606, an optical absorber 608, and a back reflector 610. Lenses in the lens array 606 may be spherical or aspherical and plano-convex in profile, having a convex side and a planar side. The optical absorber 608 is formed of a material to substantially absorb incident visible light frequencies, as described above. The back reflector 610 is configured to substantially reflect incident visible light frequencies. For example, the back reflector 610 may comprise aluminum. In some implementations, the optical absorber 608 and the back reflector 610 may be combined. For example, the optical absorber 608 may be printed on the back reflector 610.

As shown here, a lens diameter 612 is shown, along with a corresponding aperture diameter 614 which is less than the lens diameter 612. In other implementations, the diameters may be about the same.

A side view 616 shows the lens array 606 comprising an optically transparent material 618 such as glass, plastic, and so forth. Behind the lens array 606 is the optical absorber 608, which is formed with multiple apertures 620. The apertures 620 may be substantially aligned with the lenses, or offset to alter the acceptance cone, viewing cone, or both. As shown here, the reflected light 144 enters within the acceptance cone and is reflected by the back reflector 610. In contrast, the rejected light 140 is diverted into the optical absorber 608.

The lens array 606 has a thickness 622, which may vary based on the material employed. When the optically transparent material 618 of the lens array 606 comprises plastic, the thickness 622 of the lens array 606 may be about 1.5 times a radius of curvature of the plano-convex lenses. In another implementation, the thickness 622 of the lens array may be equal to or less than one-half of a lens focal length.

Figure 7:
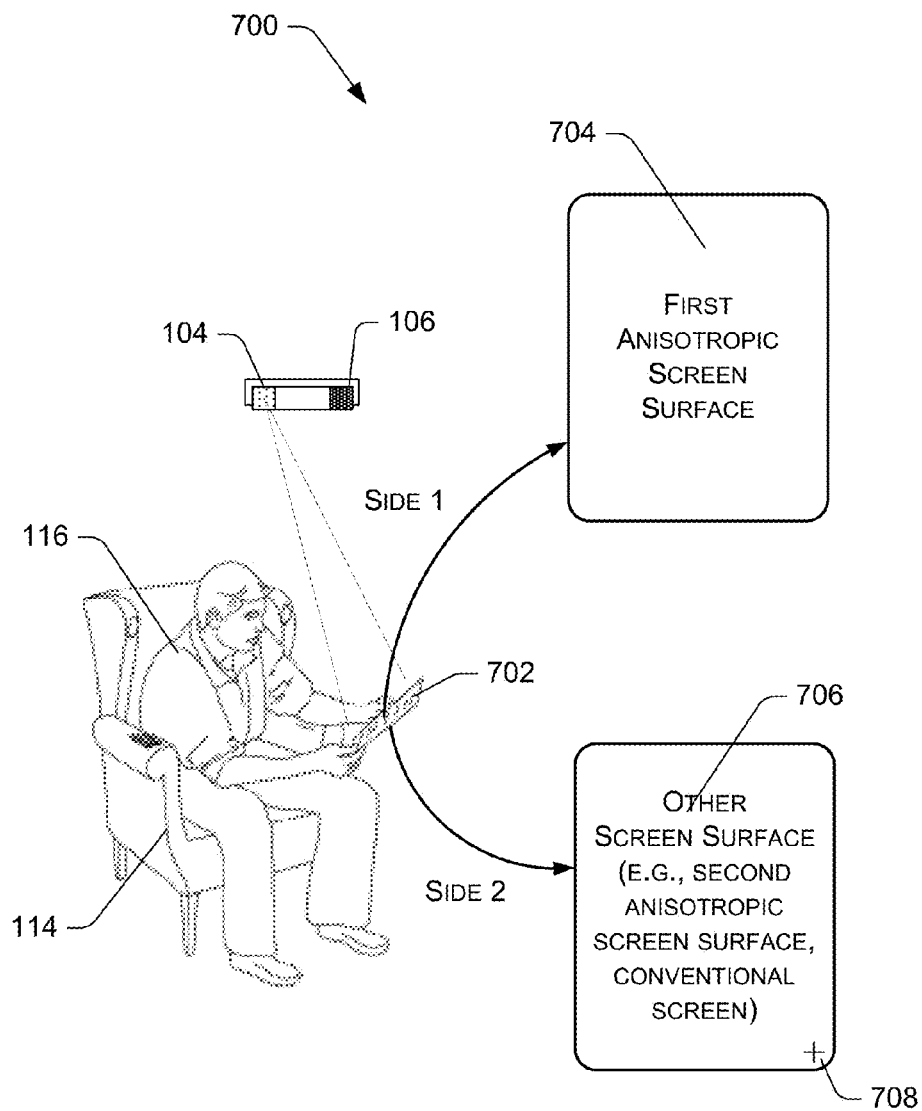
FIG. 7 illustrates a portable passive projection screen having a first side with a first anisotropic surface suitable for viewing from one direction, and a second side with any number of different surface types, including a conventional projection surface, a second anisotropic surface suitable for viewing from another direction, and so forth.

FIG. 7 illustrates a user scenario 700 in which a viewer 116 is holding a two-sided portable passive projection screen 702. The viewer is shown sitting in a chair 114, although the user may also be mobile, such as walking around a room or down a hall. The viewer 116 is looking at the first side or surface 704 of the screen 702. The first side 704 facilitates viewing of images projected by the projector 104 at an angle of incidence to the screen surface. The first side 702 may be formed as an anisotropic screen having features that receive light within an acceptance cone from a first direction, and redirect reflected light in a different direction within a viewing cone. In one example, the acceptance cone is angled within a range of 30-60 degrees relative to normal of the screen surface, whereas the viewing cone is approximately normal of the screen surface. The first side 702 may be configured using any one of the implementations described above with respect to FIGS. 2-6.

The viewer 116 may alternatively flip the screen 702 so that a second side or surface 706 is exposed to the projector 104. The second side 706 facilitates a different viewing experience than the first side 704. The second side 706 may be formed with any number of different screen surfaces. As one example, the second side 706 may have an anisotropic projection screen that enables viewing of images projected from a different direction than the first side 702. For instance, the first side 704 may facilitate viewing of images projected from a left side angle, whereas the second side 706 may facilitate viewing of images projected from a right side angle. In these cases, the second side 706 may be configured using any one of the implementations described above with respect to FIGS. 2-6, but with a different feature implementation and/or orientation than that of the first side 704. Alternatively, the second side may be implemented as a conventional projection screen surface that simply scatters light without any intended directionality.

The two sides may be distinguished by a visible registration mark, such as a mark 708 shown on the second side 706. The mark 708 may also be detectable by the camera 106 or other sensor. In some cases, the ARFN 102 may inform the user that turning over the screen 702 from one side to the other may improve the viewing experience.

Accordingly, the portable projection screen 702 may be used to view angularly projected images from multiple sides, simply by flipping the screen to expose a different surface of passive optical elements.

Illustrative Process

Figure 8:
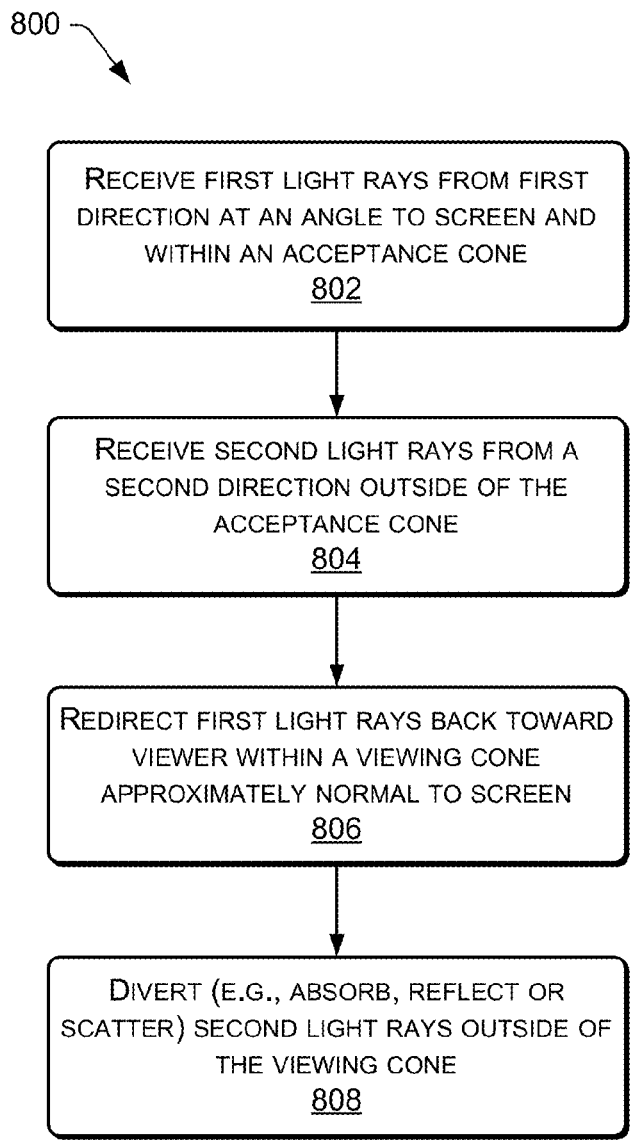
FIG. 8 is a flow diagram of an example process for receiving off angle projected images and directing the images back along a near normal axis toward a viewer.

FIG. 8 shows an illustrative process 800 for receiving off angle projected images and directing the images back along a near normal axis toward a viewer. The processes described herein may be implemented by the various passive screens shown in FIGS. 2-6. These processes are illustrated as a collection of blocks in a logical flow graph.

At 802, first light rays are received at an angle (i.e., non-normal) to the surface of a passive projection screen from a first direction. The light rays carry images projected onto the screen by a projector. The light rays are received within an acceptance cone that is off angle relative to the screen surface, such as 30-60 degrees relative to normal.

At 804, second light rays from external sources are received from a second direction outside of the acceptance cone. The second light rays may be introduced by external sources (e.g., window, room lighting, TV, etc.). As one example, the second light rays may be received from an off angle of approximately 30-60 degrees opposite to the first light rays, as shown in FIG. 2.

At 806, the first light rays are redirected from the passive projection screen within a viewing cone that is angled relative to the acceptance cone. As one example, the viewing cone may be approximately normal (i.e., 90 degrees) relative to the surface of the projection screen.

At 808, the second light rays are diverted in a direction outside of the viewing cone. For instance, the second light rays may be absorbed into the screen, or reflected and/or scattered in a direction that falls outside of the viewing cone. In this manner, the interfering second light rays are substantially reduced or eliminated from the sight of the viewer.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A device comprising:
    a passive display screen to present images projected thereon from a first direction at a non-normal angle relative to the display screen, the passive display screen comprising:
        a substrate;
        a plurality of pedestals extending from the substrate; and
        a plurality of passive optical elements, each passive optical element of the plurality of passive optical elements disposed on a pedestal of the plurality of pedestals, the plurality of passive optical elements including individual optical elements being configured to collect first light received from the first direction and reflect the first light in a second direction that is approximately normal to the display screen; and
        the individual optical elements being further configured to receive second light from a third direction that is not the first direction, wherein the second light is not substantially reflected in the second direction.

2. The device of claim 1, wherein each of the individual optical elements comprises a paraboloidal mirror.

3. The device of claim 1, wherein each of the individual optical elements comprises a paraboloidal mirror having a diameter within a range of 5 to 200 microns.

4. The device of claim 1, wherein each of the individual optical elements comprises a paraboloidal mirror having an annular perimeter.

5. The device of claim 1, wherein each of the individual optical elements comprises a paraboloidal mirror mounted at an angle to the substrate by a pedestal.

6. The device of claim 1, wherein the first direction is at an angular offset of between 30 degrees and 60 degrees relative to a direction that is normal to the display screen.

7. The device of claim 1, wherein the plurality of passive optical elements focuses the light to create an appearance of increased brightness of the images.

8. A projection system comprising:
    a passive display screen to present images projected thereon from a first direction at a non-normal angle relative to the display screen, the passive display screen comprising:
        a substrate;
        a plurality of pedestals extending from the substrate;
        a plurality of passive optical elements disposed on the plurality of pedestals, the plurality of passive optical elements including individual optical elements being configured to collect first light received from the first direction and reflect the first light in a second direction that is approximately normal to the display screen;
        the individual optical elements being further configured to receive second light from a third direction that is not the first direction, wherein the second light is not substantially reflected in the second direction; and
    a projector to project the first light along the first direction such that images are redirected by the passive display screen back along the second direction for viewing.

9. A passive projection screen to present images projected thereon, comprising:
    a substrate; and
    a plurality of optical elements disposed on the substrate and configured to present images projected thereon, each of the plurality of optical elements comprising a paraboloidal mirror extending from the substrate by a pedestal, the pedestal orienting the paraboloidal mirror at an angle relative to the substrate such that light received from a first direction that is non-normal relative to the substrate is redirected in a second direction that is approximately normal to the substrate.

10. The passive projection screen of claim 9, wherein the paraboloidal mirror has a diameter within a range of 5 to 200 microns.

11. The passive projection screen of claim 9, wherein the paraboloidal mirror has a diameter of approximately 60 microns.

12. The passive projection screen of claim 9, wherein the optical elements are spaced within a range of 100 to 130 microns.

13. A method comprising:
    receiving, at a projection screen, first light from a first direction that is within an acceptance cone having a center axis that is non-normal to the projection screen;
    receiving, at the projection screen, second light from a second direction outside of the acceptance cone;
    reflecting, from a plurality of mirrors displaced from the projection screen by a plurality of pedestals, the first light within a viewing cone having a center axis that is approximately normal to the projection screen; and
    substantially diverting the second light outside of the viewing cone or absorbing the second light.

14. The method of claim 13, wherein the acceptance cone defines a range of angles relative to the projection screen along the first direction, the range of angles being approximately 30 to 60 degrees.

15. The method of claim 13, wherein the second direction comprises any direction not within the acceptance cone associated with the first direction.

16. The method of claim 13, wherein the acceptance cone has a first center axis and the viewing cone has a second center axis, the first and center axes forming an angle of approximately 30 to 60 degrees.

17. A device comprising:
a substrate having a first side and a second side;
a first projection surface disposed on the first side of the substrate, the first projection surface comprising a plurality of first passive optical elements configured to collect light received from a first non-normal direction relative to the substrate and reflect the light in a second direction that is approximately normal to the substrate; and
a second projection surface disposed on the second side of the substrate, the second projection surface comprising a plurality of second passive optical elements configured to collect light received from a second non-normal direction relative to the substrate and reflect the light in the second direction that is approximately normal to the substrate.

18. The device of claim 17, wherein the device is a portable, handheld device.

19. The device of claim 17, wherein the substrate is configured with a longest linear dimension of equal to or less than about 60 centimeters.

20. The device of claim 17, wherein each of the plurality of first passive optical elements formed on the first projection surface comprises a first paraboloidal mirror extended above the substrate by a pedestal, the pedestal orienting the first paraboloidal mirror at an angle relative to the substrate such that light received from the non-normal direction is redirected in the second direction that is approximately normal to the substrate.

21. The device of claim 20, wherein each of the plurality of second passive optical elements formed on the second projection surface comprises a second paraboloidal mirror.

22. The device of claim 17, wherein the second projection surface comprises:
an optical absorber configured to substantially absorb incident light, the optical absorber mechanically coupled to or integrated with the substrate.

* * * * *